United States Patent [19]
Carroll, III

[11] Patent Number: 6,063,317
[45] Date of Patent: May 16, 2000

[54] METHOD FOR MOLDING POLYMERIC FIBERS INTO PRODUCTS

[75] Inventor: Phillip Patrick Carroll, III, Bloomfield Hills, Mich.

[73] Assignee: Oakwood Padded Products, Inc., Dearborn, Minn.

[21] Appl. No.: 09/053,106

[22] Filed: Apr. 1, 1998

[51] Int. Cl.$^7$ .................................................. B29C 35/04
[52] U.S. Cl. .......................... 264/122; 425/80.1; 425/82.1
[58] Field of Search .................... 425/80.1, 82.1, 425/DIG. 201, DIG. 119; 264/122, 126

[56] References Cited

U.S. PATENT DOCUMENTS

| | | | |
|---|---|---|---|
| 3,078,506 | 2/1963 | Caughey | 425/DIG. 201 |
| 4,416,071 | 11/1983 | Cunningham et al. | 425/384 |
| 4,837,067 | 6/1989 | Carey, Jr. et al. | 428/108 |
| 4,940,502 | 7/1990 | Marcus | 264/123 |
| 5,167,889 | 12/1992 | Alvarez et al. | 264/120 |
| 5,169,580 | 12/1992 | Marcus | 264/115 |
| 5,294,392 | 3/1994 | Marcus | 264/122 |
| 5,366,678 | 11/1994 | Nomizo et al. | 264/122 |
| 5,378,296 | 1/1995 | Vesa | 425/80.1 |
| 5,454,992 | 10/1995 | Curran et al. | 264/122 |
| 5,456,873 | 10/1995 | Nomizo | 264/122 |
| 5,476,618 | 12/1995 | Ito et al. | 264/126 |
| 5,489,351 | 2/1996 | Yoshida et al. | 264/112 |
| 5,492,662 | 2/1996 | Kargol et al. | 264/119 |
| 5,494,627 | 2/1996 | Kargol et al. | 264/119 |
| 5,500,295 | 3/1996 | Halm et al. | 428/357 |
| 5,505,815 | 4/1996 | Yoshida et al. | 425/405.1 |
| 5,529,479 | 6/1996 | Souders | 425/DIG. 119 |
| 5,569,425 | 10/1996 | Gill et al. | 425/80.1 |
| 5,571,465 | 11/1996 | Gill et al. | 264/121 |
| 5,586,350 | 12/1996 | Thönnessen et al. | 5/636 |
| 5,587,121 | 12/1996 | Vesa | 425/80.1 |
| 5,618,364 | 4/1997 | Kwok | 264/122 |
| 5,683,811 | 11/1997 | Hernandez et al. | 428/373 |
| 5,824,246 | 10/1998 | Reetz | 264/122 |

FOREIGN PATENT DOCUMENTS

WO 88/05421  7/1988  WIPO .

*Primary Examiner*—Robert Davis
*Attorney, Agent, or Firm*—Brooks & Kushman P.C.

[57] ABSTRACT

An apparatus and method are provided for molding clusters of fibers, including at least some thermoplastic fibers, into products at a cost, quality, and performance level acceptable for commercial production. The clusters are dedensified 10 and then placed 12 into an empty mold 20. The mold 20 has apertures 28 to facilitate the transfer of thermal energy through the mold 20. A linear conveyor 32 is used to transport the mold through a plurality of process locations on a continuous or semi-continuous basis. Included is a heating location 48 wherein the mold 20 is heated 14, providing an influx of thermal energy sufficient to fuse the thermoplastic fibers to form a heated product. A cooling location 50 follows the heating location 48, wherein the mold 20 and the heated product contained therein are cooled 6 to produce a cooled product. The cooled product is then ejected 18 from the mold 20.

10 Claims, 5 Drawing Sheets

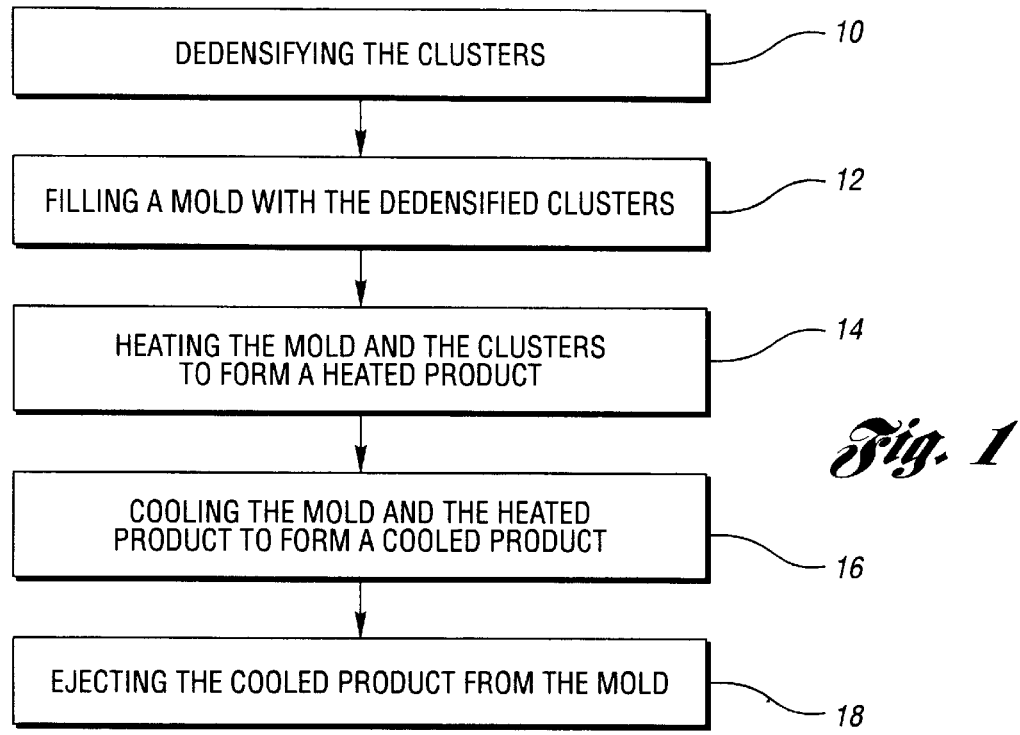
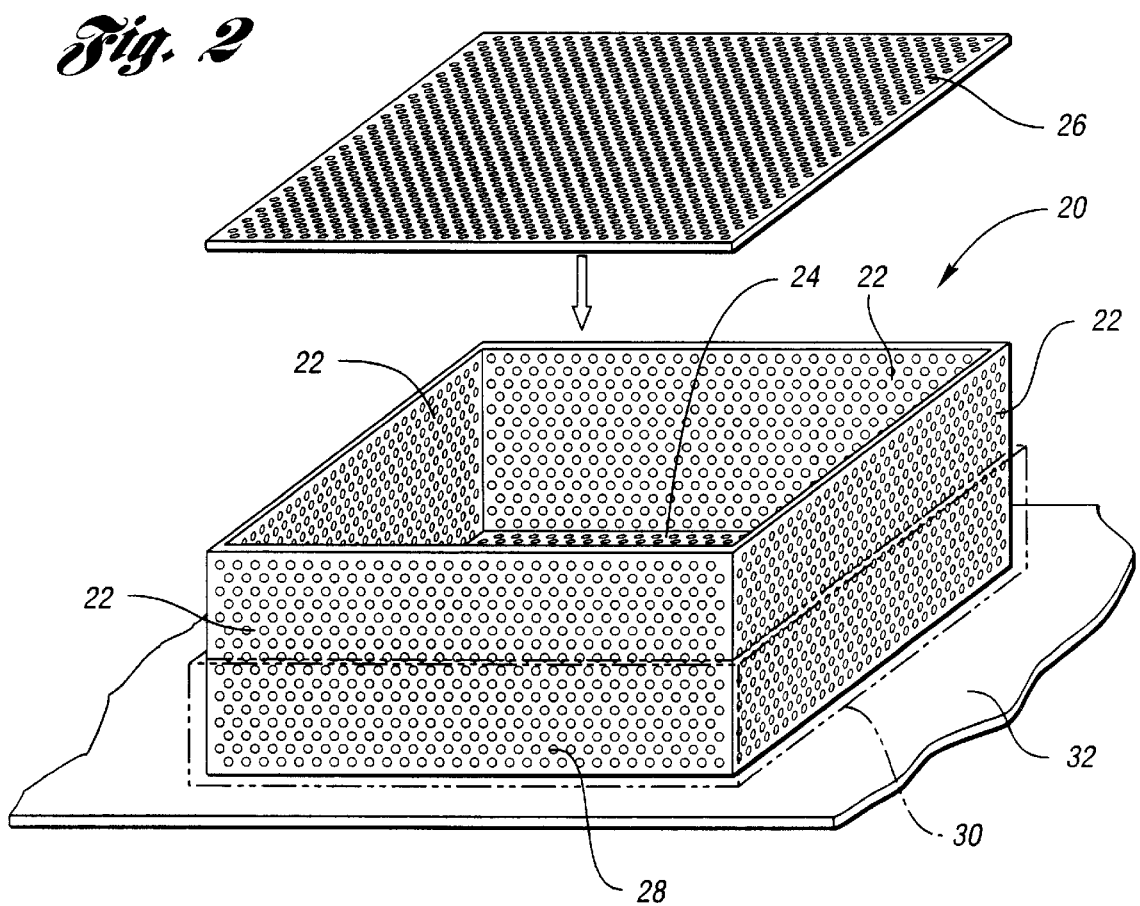

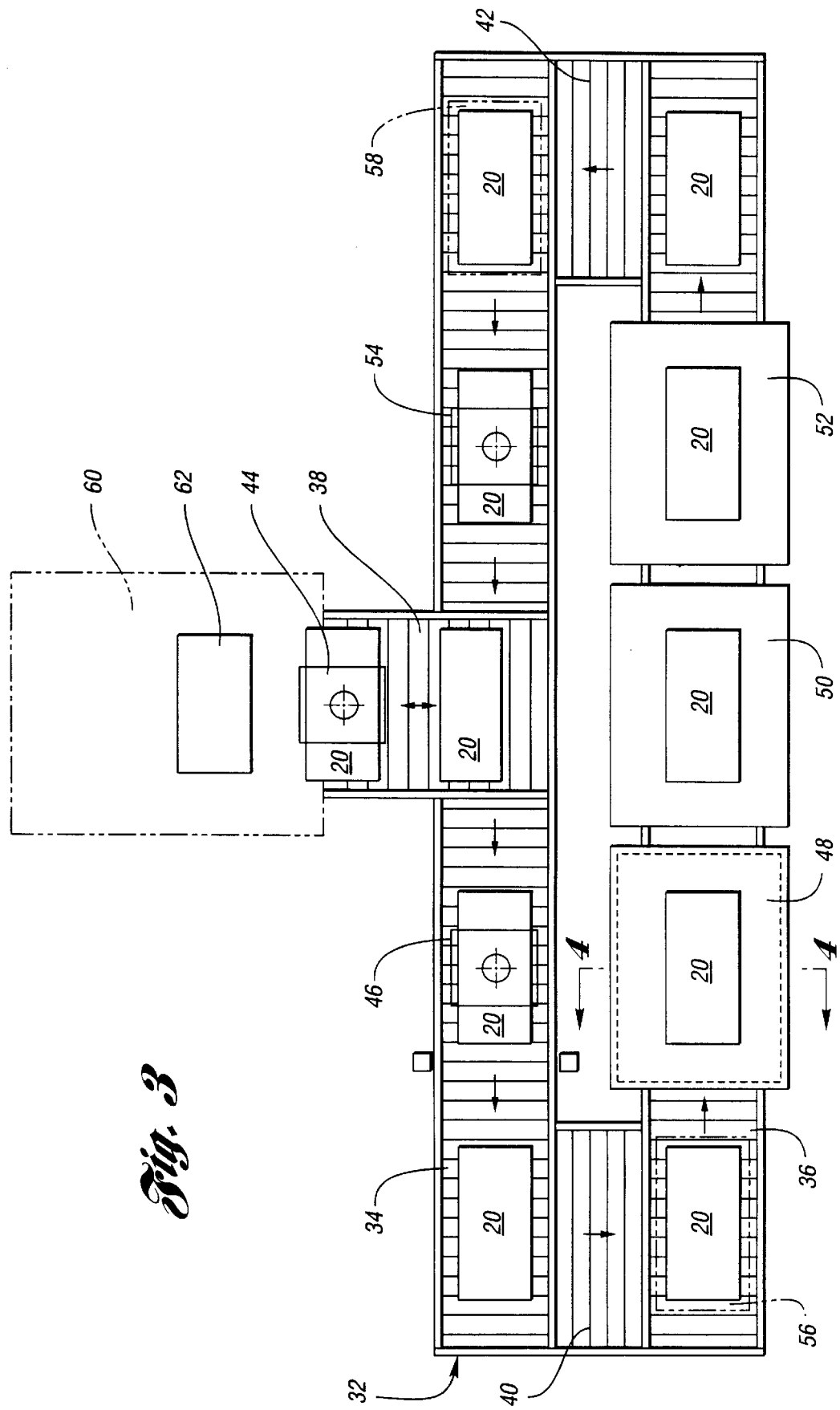

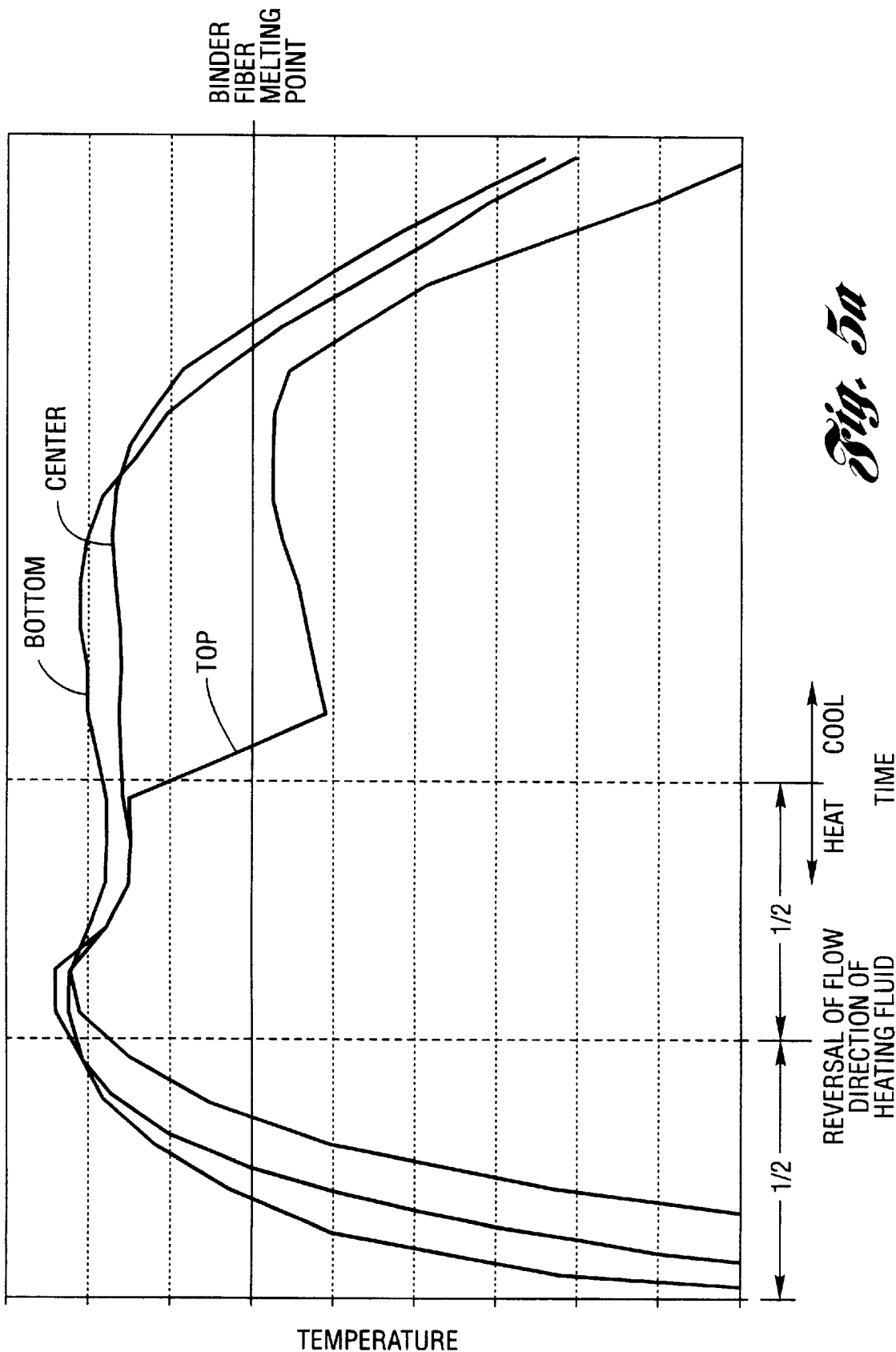

METHOD FOR MOLDING POLYMERIC FIBERS INTO PRODUCTS

TECHNICAL FIELD

This invention relates to an apparatus and method for molding polymeric fibers into products, such as pads or cushions for furniture, car seats, mattresses, and the like, and more particularly to the process conditions and equipment necessary to make products from polymeric fibers at a cost, quality, and performance level acceptable for commercial production.

BACKGROUND ART

The use of certain polymeric fibers, as opposed to primarily polyurethane foam, to make filled articles such as pads or cushions has been shown to result in improved performance characteristics. Compared with foam products, fiber-filled products may be more durable, have lighter weight, have greater permeability, be less costly, and be more readily recyclable.

A further improvement in the quality of fiber-filled articles was described in U.S. Pat. No. 4,940,502, wherein clusters of fibers, sometimes termed fiberballs, were used to create fiber-filled products. Fiberballs have a three dimensional structure which provides resilience upon deformation. From experiments reported in U.S. Pat. No. 5,169,580, fiberball cushions showed firmer support and higher resistance to repetitive compressions than batt cushions, even when the fiberball cushions were of a lower density. When molded, the forces which bond the fiberballs to each other are generally much weaker than the forces which resist compression of the individual fiberballs. This structure allows for resilience while also providing adequate local stiffness.

Although several patents, for example U.S. Pat. Nos. 5,169,580; 5,454,992; and 5,492,662, disclose processes and machinery for molding fiber-filled products, little attempt has been made to relate particular aspects of the molding method and apparatus to the performance and utility of the articles produced.

SUMMARY OF THE INVENTION

In order to be molded, fiber clusters must contain at least some thermoplastic fibers, defined as fibers capable of being repeatedly softened by heating, and hardened by cooling through a characteristic temperature range. Fiber clusters are often made from a mixture of high melting point matrix fibers and low melting point, thermoplastic binder fibers. The clusters are fused into a desired shape by placing the clusters in a mold formed with holes in its surfaces, then passing a heating fluid such as air through the mold. By using a heating fluid temperature which is above the binder fiber melting point, but below the matrix fiber melting point, substantially only the binder fibers soften during heating and the matrix fibers remain firm. The resulting product is cooled with a fluid which is cooler than the binder fiber melting point, thereby bonding the binder fibers such that the mixture retains the shape of the mold.

It is an object of the present invention to relate molding process conditions and machinery design to the performance of the fiber-filled products created therefrom.

Accordingly, an apparatus and method are provided for molding clusters of fibers, including at least some thermoplastic fibers, into products at a cost, quality, and performance level acceptable for commercial production. The clusters, which are typically shipped in a compressed state, are dedensified and then placed into an empty mold. The mold has apertures to facilitate the transfer of thermal energy into the mold. A conveyor is used to transport the mold through a plurality of process locations on an indexed, continuous, or semi-continuous basis. Included are one or more heating locations wherein the mold is heated, providing an influx of thermal energy sufficient to fuse the thermoplastic fibers to form a heated product. One or more cooling locations follow the heating location, wherein the mold and the heated product are cooled to produce a cooled product. The cooled product is then ejected from the mold.

In a preferred embodiment, parameters such as the heating fluid temperature, direction of heating fluid application, cooling fluid temperature, mold thickness, and mold aperture size have been selected which provide improved performance characteristics of the molded product.

The specific features and advantages of the present invention are more readily understood from a review of the attached drawings and the accompanying specification and claims.

BRIEF DESCRIPTION OF THE DRAWINGS

FIG. 1 is a block diagram of a molding method in accordance with the present invention;

FIG. 2 is a perspective view of a mold constructed in accordance with the present invention;

FIG. 3 is a top, schematic view of a linear conveyor and process locations utilized in the molding method of the present invention;

FIGS. 5A and 5B depict relationships of temperature vs. time for different sections of the mold during heating cycles illustrative of prior art methods (FIG. 5a) and a preferred method of the present invention (FIG. 5b).

BEST MODE(S) FOR PRACTICING THE INVENTION

Figure 4:
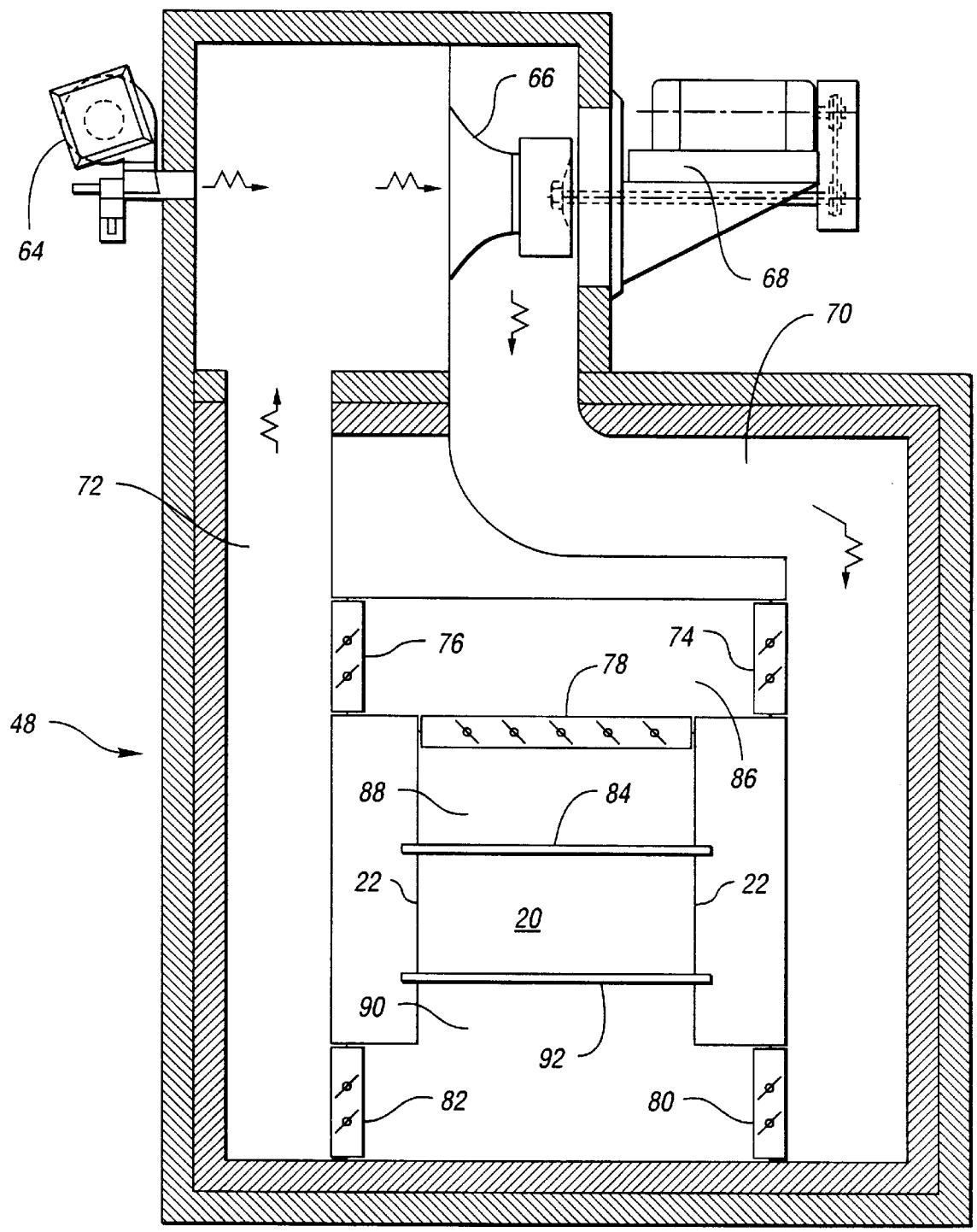
FIG. 4 is a end, cross-sectional view of a heating station provided in the present invention.

The automotive seating and furniture industries, among others, test the performance of their molded products. Common tests include load vs. deflection plots to determine stiffness or softness, resistance to cyclic compressions which indicates fatigue resistance, resistance to constant compression at elevated temperature, known as heat set resistance, and surface texture. Through properly designed experiments, Applicant has determined certain aspects of the molding apparatus and method which improve these performance characteristics, disclosed as follows.

The present invention is an apparatus and method for molding products from a blend of at least two types of polymeric fibers: binder fibers and matrix fibers. The binder fibers, which are thermoplastic, possess a melting point separated from and lower than the matrix fibers. Preferably, the binder fibers have a melting point at least 55° C. lower than the melting point of the matrix fibers. In the present invention, binder fibers comprise ~20% by volume of the fiber blend, but more or less may be used.

Binder fibers and matrix fibers may be made separately from relatively homogeneous polymers, or they may be combined within bicomponent fibers which have regions of different melting points. An example of the latter is a fiber with a matrix core having a high melting point, and a full or partial binder sheath having a lower melting point. Binder fibers and matrix fibers may be composed of any of a variety of natural or synthetic polymeric materials, including polyethylene, polypropylene, and polyester.

In a preferred embodiment of the present invention, the fibers used are Dacron® polyester fiberfill from E. I. du Pont De Nemours & Co., Inc. Specifically, these are clusters of 0.75 in. long, hollow, bicomponent fibers which are 6 denier per filament. The matrix fiber core has a melting point of 260° C., and the binder fiber sheath has a melting point of 110 to 160° C., or some other temperature less than the matrix fiber melting point. In an alternative embodiment, a third type of polymeric fiber may be combined with the fiber clusters. In this embodiment, longer fibers are intertwined with the clusters prior to heating to increase the integrity of the molded product.

Clusters are typically transported in densely packed containers. As a result, the use of fiber clusters directly from the container might result an overly dense product. Consequently, the fiber clusters are typically dedensified, usually to less than 2 $lb_m/ft^3$. Such dedensification can be accomplished by a variety of lofting techniques including paddles, stirrers, blowers, agitators, or mixers. A preferred method is to pass the clusters through a centrifugal fan.

The method of the present invention is outlined in FIG. 1. As described above, the fiber clusters are first dedensified manually or automatically, as shown in block 10. Next, in block 12, a mold is at least partially filled with the fiber clusters. The mold is then heated, as shown in block 14, whereby an influx of thermal energy fuses the thermoplastic fibers to form a heated product. In block 16, the mold and the heated product are cooled, thereby producing a cooled product molded to shape. Lastly, in block 18, the cooled product is ejected from the mold.

The method of the present invention applies equally well to batch or continuous molding processes, and further details of the method will be given in the description that follows.

Referring now to FIG. 2, a mold 20 constructed in accordance with the present invention is shown. Mold 20, which may be of any shape, comprises a plurality of walls 22, a base 24, and a mold cover 26. Preferably, base 24 and cover 26 each have apertures 28 of any shape that allow the passage of fluids therethrough. In an alternative embodiment, walls 22 may also be provided with apertures 28. Apertures 28 preferably provide an open area of over 25 to 35%, and may be arranged in a straight row or staggered pattern. Apertures 28 may be made by a mechanical process, such as perforating, expanding, or etching, by casting, by explosive bonding, or by any other process that creates holes.

Prior art molds have typically been constructed of sheet metal having a thickness of 1.5 mm (16 gage) or larger, and formed with circular apertures with a diameter of 3 mm or larger. In the present invention, sheets of metal thinner than 1.5 mm are preferred to construct mold 20, with apertures 28 of a diameter less than 3 mm formed therein. A series of experiments has confirmed the durability of thinner sheets of metal to repeated molding cycles. In addition, Reynolds numbers were calculated which indicated that flow through the smaller apertures was still laminar and sufficient for molding. When implemented, the mold construction of the present invention improved performance characteristics such as the heat set resistance and fatigue resistance. By providing a smaller heat sink, the thinner metal also decreases the energy used in the molding process as well as decreasing the necessary molding time. Furthermore, the smaller apertures improve the surface texture of the molded product as less fiber tends to stick through the apertures to form dimples in the finished product.

Mold 20 can alternatively be constructed from materials with less heat capacity than steel, aluminum, or other metals. Lower heat capacities result in less energy being absorbed by mold 20, resulting in lower molding costs. Mold 20 can be made of non-metallic materials, including ceramics and polymers, particularly those that can be welded.

Referring again to FIG. 2, a frame 30 holds mold 20 and allows the shape of mold 20 to be altered within the dimensions of frame 30. Alternatively, frame 30 may contain several molds 20, such that more than one product may be molded at a time. A plurality of frames 30 may be used simultaneously so that a continuous or semi-continuous molding process can be achieved. Prior art molding systems, such as that disclosed in U.S. Pat. No. 5,454,992, utilize a carousel arrangement for moving molds 20 through the various process locations. In the present invention, molds 20 are moved through process locations using a linear conveyor 32 to which a plurality of frames 30 may be affixed. Conveyor 32 provides a more economical system than belt or carousel systems due to quicker, higher volume throughput.

Conveyor 32 may be of the indexed type, wherein molds 20 are moved from one process location to the next with a predetermined time interval. In an alternative embodiment, a continuous conveyor may be used. In this embodiment, molds 20 are passed through continuous heating and cooling zones, as opposed to keeping molds 20 fixed relative to the fluid flow mechanisms.

Shown in FIG. 3 is a molding apparatus, including conveyor 32 and the plurality of process locations, or stations, constructed in accordance with a preferred embodiment of the present invention. In this embodiment, linear conveyor 32 is of the indexed type, comprising two transfer conveyors 34 and 36 and two shuttle conveyors 40 and 42 to allow operation of the molding apparatus within a relatively compact space. If necessary, a third shuttle conveyor 38 may be used to move mold 20 to transfer conveyor 34 as shown. As stated above, conveyor 32 may carry a plurality of frames 30 such that many molds 20 can be circulated through the various process stations on a semi-continuous basis. It will be appreciated that the disclosed linear conveyor 32 may be of any length necessary to suit the manufacturing requirements.

First, mold 20 is at least partially filled with fiber clusters at filling station 44. Mold 20 is then transported via shuttle conveyor 38 to a mold closing station 46 on transfer conveyor 34, where mold cover 26 is manually or automatically secured to mold 20. Next, mold 20 is moved via shuttle conveyor 40 to a heating station 48. Transfer conveyor 36 then moves mold 20 to a cooling station 50. As shown, an additional cooling station 52 is preferably incorporated prior to transporting mold 20 to an ejection station 54 via shuttle conveyor 42. Two mold ready stations 56 and 58 allow for time delays between closing station 46 and heating station 48 and between cooling station 52 and ejection station 54, respectively.

Placement of fiber clusters into mold 20 can be accomplished in several ways. Clusters can be manually loaded into mold 20 at filling station 44, but preferably clusters are introduced into mold 20 automatically by a transport device 60. Tests determined that a standard textile feed apron can transport fiber clusters without significant degradation, such that acceptable performance properties are retained in the subsequently molded material. Alternatively, a screw feeder of increasing pitch in the direction of transport may be used to transport fiber clusters into mold 20, or clusters may be fed by gravity into mold 20 from a hopper. A DIAMOND-BACK® hopper provides gravity flow without bridging over at the discharge like a standard conical hopper would at the same discharge size. Transport device 60 preferably has an automatic weighing apparatus 62 attached thereto for weighing the clusters prior to filling mold 20. Alternatively, a mass flow measurement of fiber clusters may be obtained using X-rays, active acoustic, or passive vibration monitoring.

Clusters are placed in mold 20, typically to a height in excess of twice the height of the finished molded product. Preferably, the fibers are interlaced manually or mechanically by mixing, moving, shaking, or vibration before mold 20 is closed at closing station 46. Alternatively, an electrostatic charge can be used to create a more uniform distribution of clusters prior to closing mold 20.

The clusters may be compressed beyond the pressure necessary to close mold 20 in order to improve performance of the molded product. Experiments were conducted to determine the effect of multiple compressions of the fiber clusters, both before heating and while the mold material was at least partially above the melt point of the binder fiber. The performance of the molded product was relatively little affected by dwell time and the speed of compressions. However, the heat set resistance, fatigue resistance, and stiffness of the products were significantly affected by the number of compression cycles and the pressure of the compressions. In the present invention, the fiber clusters may be compressed more than once during the molding process under a pressure greater than 25 lb/ft$^2$.

At heating station 48, which is illustrated in FIG. 4, a heating fluid, typically air, is passed through mold 20 for a time long enough to allow fusing of the binder fibers. Heating station 48 includes a heater 64 for heating the air to a temperature sufficient to soften the binder fibers. Heater 64 is in communication with a fan 66 which is rotatably driven by a motor 68. Fan 66 directs air toward mold 20 through a duct 70, and receives air from mold 20 through a duct 72.

Heating station 48 includes a plurality of dampers 74, 76, 78, 80, and 82 which are selectively opened and closed in order to direct air flow through or around mold 20. To force air through the top 84 of mold 20, dampers 76 and 80 are closed, and dampers 74, 78, and 82 are opened. Air moves from fan 66 into duct 70, through damper 74 into a duct 86, through damper 78 into a duct 88, through mold 20 into a duct 90, through damper 82, and back to fan 66 through duct 72. To force air through the bottom 92 of mold 20, dampers 74 and 82 are closed, and dampers 76, 78, and 80 are opened. Air moves from fan 66 into duct 70, through damper 80 into duct 90, through mold 20 into duct 88, through damper 78 into duct 86, through damper 76, and back to fan 66 through duct 72.

Figure 5B:
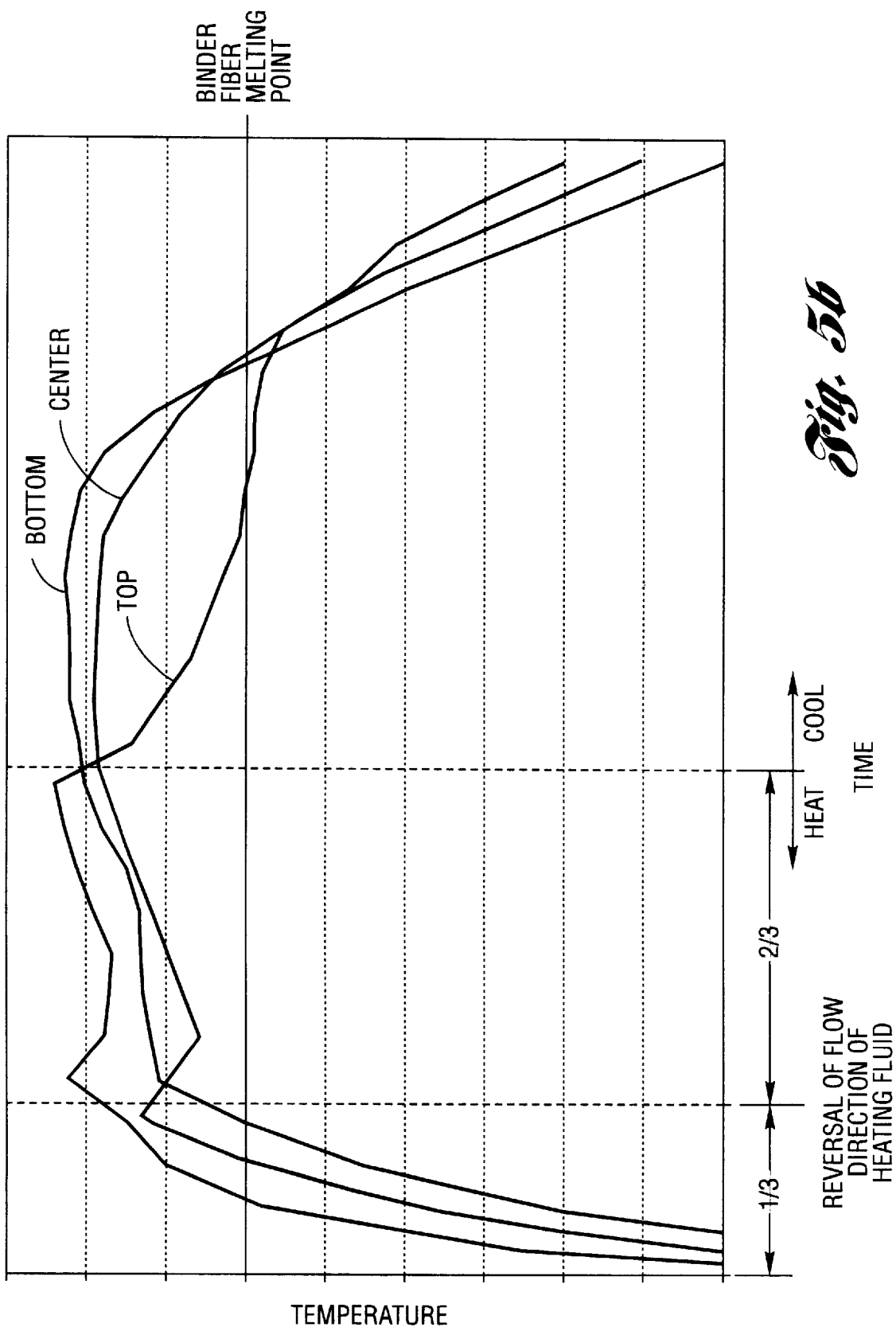

U.S. Pat. No. 5,169,580 describes a molding machine equipped to provide heating fluid flow which is initially up through the mold and is then reversed to be blown downward through the mold halfway through the heating cycle. This method was used to attempt to ensure uniform bonding of the fibers. In the present invention, experiments were performed in which thermocouples were placed in the center, near the top 84, and near the bottom 92 of mold 20. A graph of time vs. temperature from each thermocouple is shown for a reversal in the direction of air flow halfway through the heating time in FIG. 5a, and one-third of the way through the heating time in FIG. 5b. Concentrating on the portion of the graphs above the binder fiber melting point, the area under each curve was calculated. The results indicated that the greatest uniformity in heating between the three areas of the mold was observed when the direction of flow was reversed at a point less than halfway through the molding cycle, as in FIG. 5b, and this is the method preferred in the present invention.

In a preferred embodiment of the present invention, the heating fluid has a temperature less than 55° C. over the melting point of the binder fiber. This constraint on the heating fluid temperature was shown through experimentation to improve both the fatigue resistance and heat set resistance of the molded products. Preferably, the heating fluid flow rate is between 70 and 110 ft/min.

Referring again to FIG. 4, ducts 88 and 90 are preferably centered symmetrically over the top 84 and bottom 92 of mold 20, respectively, such that air flow is directed perpendicularly to top 84 or bottom 92 of mold 20 and is uniformly distributed across the entire mold 20. An alternative embodiment allows air to be directed through walls 22 of mold 20 as well. In a preferred embodiment, less than 6% of the air flow is allowed to bypass mold 20 and flow between mold walls 22 and frame 30. To save energy, the hot air can be recovered, reheated to the working temperature, and recycled. While conveyor 32 is in the process of moving a new mold 20 into heating station 48, dampers 78, 80, and 82 are closed, and dampers 74 and 76 are opened. Air flows from fan 66 into duct 70, through damper 74 into duct 86, through damper 76, and back to fan 66 through duct 72.

After heating, mold 20 is transported to cooling station 50, which is arranged similarly to heating station 48 shown in FIG. 4. A cooling fluid having a temperature below the melting point of the binder fiber is passed through mold 20, either by force or by natural convection. With forced convection, the air flow can be through the top 84 of mold 20, the bottom 92 of mold 20, the walls 22 of mold 20, or a combination of these directions.

A series of experiments was performed in which it was determined that the slower the product is cooled, the better are certain performance properties. The molded product can be cooled more slowly by slowing the flow rate of cooling fluid, increasing cooling fluid temperature, or both. In the method of the present invention, the flow rate of cooling fluid is between 20 and 40 ft/min, much lower than the preferred heating fluid flow rate. Alternatively, the molded product can be cooled more slowly using natural convection. In order to lengthen the cooling process, additional cooling station 52 is incorporated along transfer conveyor 36. In addition, the cooling fluid temperature is preferably at or above a typical ambient temperature of 15° C., but below the melting point of the binder fiber.

As with heating station 48, a substantial part of the energy can be recovered from cooling stations 50 and 52 and channeled to oven 64 using an external air duct (not shown). Once the product has cooled enough so that the polymeric bonds have solidified, mold 20 can be opened manually or automatically at ejection station 54 and the cooled product will retain its shape. Densities of the molded structures will generally be on the order of 1 to 5 or more $lb_m/ft^3$.

In addition to cushions and pads, it is understood that molded fiber-filled products produced by the apparatus and method of this invention may include acoustic attenuators, spacers, filters, and other end-use applications.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for molding clusters of fibers, including at least some thermoplastic fibers, into products, the method comprising:

at least partially filling a mold with the clusters, the mold having apertures to facilitate the transfer of thermal energy into the mold;

heating the clusters within the mold with a heating fluid while allowing at least some of the heating fluid to bypass the mold, whereby an influx of thermal energy over time provided by the heating fluid fuses the thermoplastic fibers contained therein to form a heated product; and cooling the heated product to produce a cooled product.

2. The method of claim 1, further comprising dedensifying the clusters prior to heating the at least partially filled mold.

3. The method of claim 1, further comprising interlacing the clusters to improve cluster distribution.

4. The method of claim 1, wherein the clusters of fibers comprise a mixture of high melting point matrix fibers and relatively lower melting point, thermoplastic binder fibers.

5. The method of claim 1, wherein the heating fluid has a temperature less than 55° C. above the melting point of the thermoplastic fibers.

6. The method of claim 1, wherein heating the at least partially filled mold includes reversing the direction of heating fluid flow through the mold at a time point less than halfway through the total heating time.

7. The method of claim 1, wherein less than 6% of the heating fluid is allowed to bypass the mold during heating.

8. The method of claim 1, wherein the clusters are compressed more than once prior to heating to improve the performance of the cooled product.

9. The method of claim 1, wherein the heated product is cooled with a cooling fluid having a temperature of at least 15° C. and no greater than the melting point of the thermoplastic fibers.

10. The method of claim 1, wherein the clusters are intertwined with additional fibers prior to heating in order to increase the integrity of the cooled product.

\* \* \* \* \*